United States Patent
Sirianni

(10) Patent No.: US 8,347,265 B1
(45) Date of Patent: Jan. 1, 2013

(54) METHOD AND APPARATUS FOR GENERATING A COMMAND LINE INTERPRETER

(75) Inventor: Eric Sirianni, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1429 days.

(21) Appl. No.: 11/729,038

(22) Filed: Mar. 27, 2007

(51) Int. Cl.
G06F 9/44 (2006.01)

(52) U.S. Cl. ........................................................ 717/108

(58) Field of Classification Search .................. None
See application file for complete search history.

(56) References Cited

U.S. PATENT DOCUMENTS

| | | | |
|---|---|---|---|
| 6,665,866 B1* | 12/2003 | Kwiatkowski et al. | 717/159 |
| 2003/0107597 A1* | 6/2003 | Jameson | 345/762 |
| 2003/0163448 A1* | 8/2003 | Kilemba et al. | 707/1 |
| 2004/0040016 A1* | 2/2004 | Pearce et al. | 717/141 |
| 2004/0158621 A1* | 8/2004 | Reyna | 709/220 |
| 2005/0177818 A1* | 8/2005 | Huene et al. | 717/116 |
| 2006/0013217 A1* | 1/2006 | Datla et al. | 370/389 |
| 2006/0130019 A1* | 6/2006 | Cool et al. | 717/140 |
| 2006/0195411 A1* | 8/2006 | Knight et al. | 706/45 |
| 2007/0168917 A1* | 7/2007 | Janson | 717/101 |
| 2007/0234318 A1* | 10/2007 | Seto et al. | 717/140 |
| 2007/0243887 A1* | 10/2007 | Bandhole et al. | 455/461 |
| 2008/0196005 A1* | 8/2008 | Beckman et al. | 717/108 |

OTHER PUBLICATIONS

"Clig—Command Line Interpreter Generator" published in 2004.*
"SQLBindParameter function (CLI)—Bind a parameter marker to a buffer or LOB locator," published Oct. 27, 2006.*
"Annotations," published Sep. 21, 2006.*
Lorenat, Michael Jerome. "Automated user interface generation from minimal specifications." Published 1996. http://proquest.umi.com/pqdlink?did=743180871&Fmt=7&clientId=19649&RQT=309&VName=PQD.*
"Java Annotations," http://java.sun.com/j2se/1.5.0/docs/guide/language/annotations.html, printed Sep. 21, 2006, 4 pages.
"Introduction—Commons CLI," http://jakarta.apache.org/commons/cli/introduction.html, printed Mar. 26, 2007, 1 page.
"Usage Scenarios—Commons CLI," http://jakarta.apache.org/commons/cli/usage.html, printed Mar. 26, 2007, 6 pages.
"Option Properties—Commons CLI," http://jakarta.apache.org/commons/cli/properties.html, printed Mar. 26, 2007, 1 page.

* cited by examiner

*Primary Examiner* — Anil Khatri
*Assistant Examiner* — Adam R Banes
(74) *Attorney, Agent, or Firm* — Blakely, Sokoloff, Taylor & Zafman LLP

(57) ABSTRACT

A method of exposing the functionality of an application in a command interface includes generating a command line interpreter ("CLI") from a component of an application. The application's components are used to automatically generate the CLI to interpret commands to access the functionality of the application. The generated CLI parses, maps, and dispatches the commands and any associated arguments in accordance with the application's components. Application metadata is used to modify the generated CLI to customize the exposure of the functionality of the application in the command interface.

41 Claims, 11 Drawing Sheets

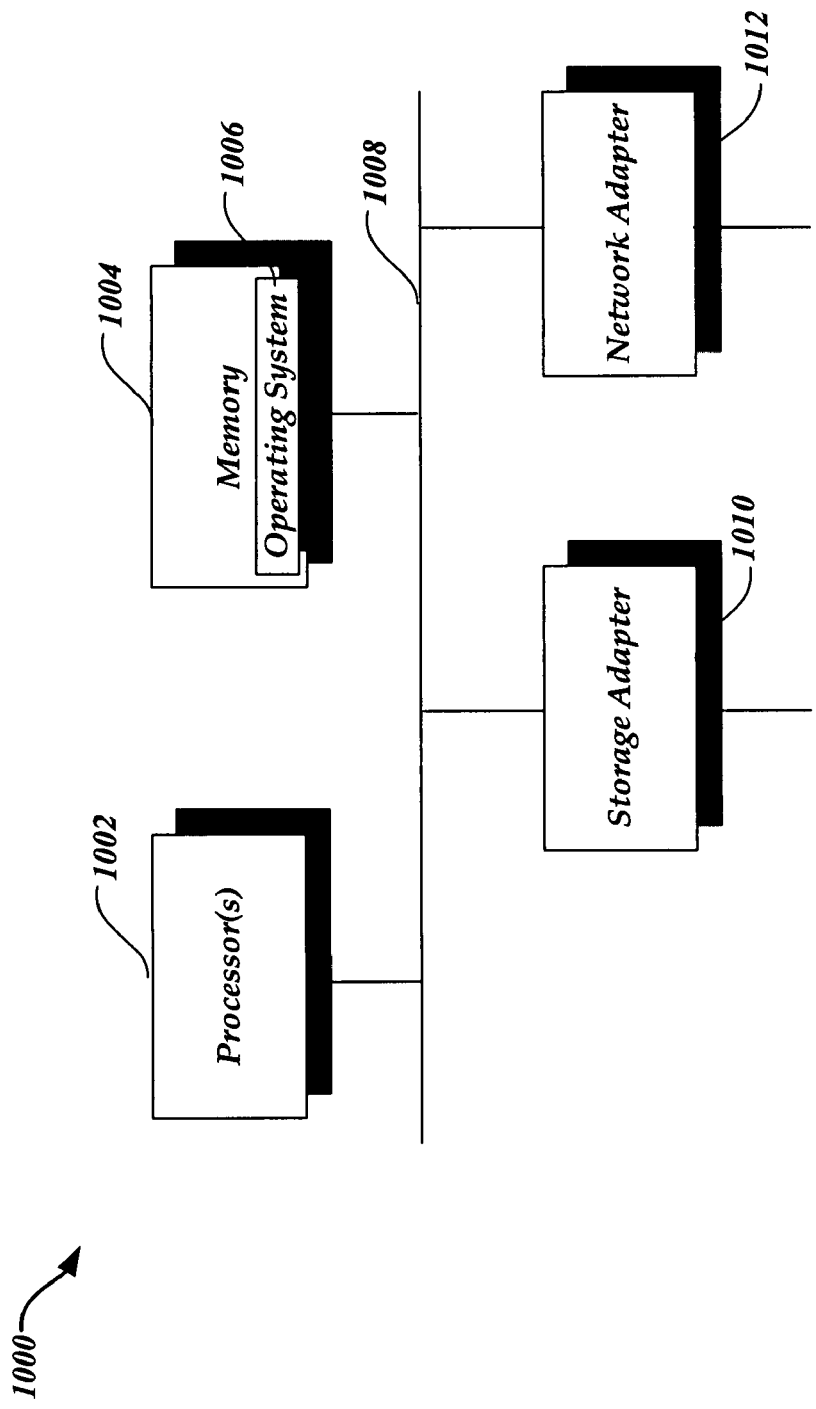

METHOD AND APPARATUS FOR GENERATING A COMMAND LINE INTERPRETER

FIELD OF THE INVENTION

At least one embodiment of the present invention pertains to a command line interpreter ("CLI") to interpret commands received via a command interface to an application on a computer system, and more particularly, to a technique for generating the CLI from an application component.

BACKGROUND

An application program interface ("API") to an application program is used to expose the functionality of the application to other programs and systems in a uniform manner. Often, it is desirable to also provide a command interface to the same functionality of the application that is exposed via the API. A command interface to an application program, as opposed to an API, is used to expose the functionality of the application to a user entering commands into a computer terminal or other user input device through which the application may be accessed. A command interface is typically supported by software that is referred to as a command line interpreter ("CLI"). Among other things, the CLI contains the logic to interpret commands received via the command interface. For example, an application for managing databases on a storage system may have an API to access functionality to carry out a backup process, such as a method to initiate the backup on the storage system and various parameters to specify the name of the database and a label to apply to the backup. A corresponding CLI might contain logic to interpret a backup command to access that same functionality to carry out the backup process via the command interface.

The CLI logic typically performs at least three core tasks. The first task is to parse and optionally error-check and/or otherwise validate the command and any arguments entered with the command. The second task is to map the parsed command and its arguments to the corresponding functionality in the application. The third task is to dispatch the command and its arguments by invoking the corresponding functionality of the application.

In some programming environments, there are techniques to automate one of the tasks of parsing, mapping, and dispatching, or to otherwise shorten the time required to develop the CLI logic for a given task. For example, in some cases programmers can at least partly automate the task of parsing or error-checking and/or otherwise validating a command received in a command interface with reusable code components. The reusable code may be obtained from a common library of reusable objects for processing a command, including parsing and validating, i.e., error-checking the syntax of the command and validating the values. The common library of reusable objects is typically stored in a library external to the specific application for which the CLI logic is being developed. An example of such an external library is described in the Apache Commons CLI (http://jakarta.apache.org/commons/cli/). While such external libraries of reusable code components may be useful, there is nothing to connect a common library to a specific application.

As another example, some programming environments may provide an external file that can be used to at least partly automate the task of mapping a command. The external file specifies the mapping of the command and argument to the corresponding functionality of the application. While such external mapping files may be helpful, they require constant manual synchronization to the functionality in the current version of the application.

Despite the availability of such techniques, there is currently no satisfactory comprehensive way to automatically perform all three of the core CLI tasks of parsing, mapping, and dispatching. As a result the CLI logic is often written entirely by hand, which is error-prone and time-consuming. As with the external files to specify mapping, hand-coded CLIs also require constant manual synchronization to the functionality in the current version of the application. For example, adding new functionality to an application having a command interface typically requires numerous modifications to the CLI, including 1) a modification of the parsing logic to accept a new command and arguments corresponding to the new functionality, 2) a modification of the mapping logic to map the new command and arguments to the new application components that carry out the new functionality, and 3) a modification of the dispatching logic to invoke the new application components when the new command is issued. Consequently, a CLI to interpret commands in a command interface to an application can be cumbersome to develop and maintain.

SUMMARY OF THE INVENTION

The present invention includes a method and apparatus for exposing the functionality of an application in a command interface by automatically generating a command line interpreter from the application, including generating a CLI from an application program interface ("API") component or other type of component representing the functionality of the application. In one embodiment, the method includes receiving a request to generate a CLI to interpret a command to access a functionality of an application, obtaining an API component, or other type of component representing the functionality of the application, and generating from the application component a CLI component to facilitate accessing the functionality of the application using the command, including parsing the command according to the application component, mapping the parsed command to the application component, and dispatching the command according to the application component.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 10 shows an example of the hardware architecture of a computer system in which a CLI may be generated from an application, and in which commands may be interpreted using a CLI generated from an application, as shown in FIGS. 2-9.

DETAILED DESCRIPTION

Figure 1:
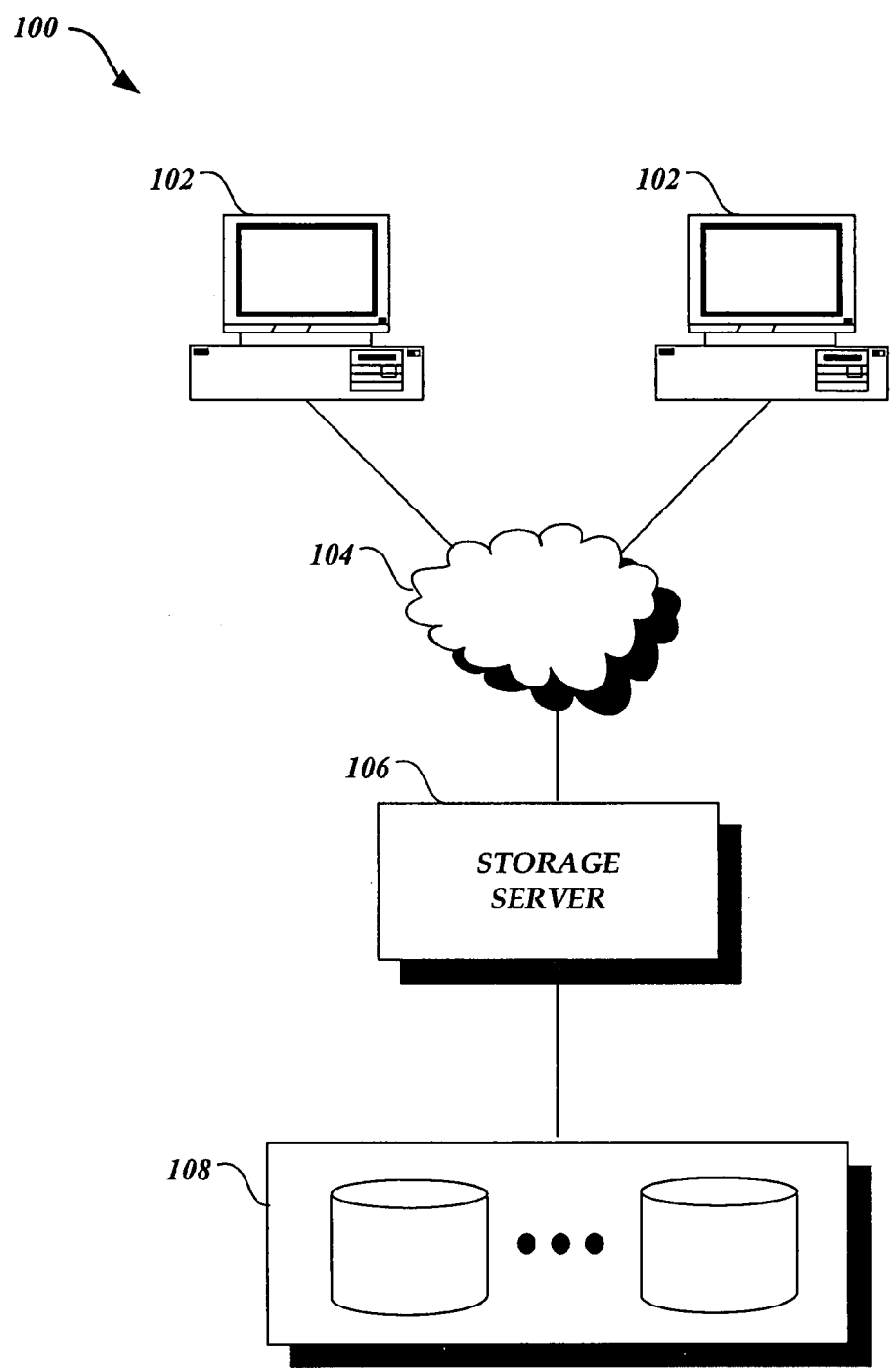
FIG. 1 illustrates a storage network environment including a storage server in which an embodiment of the invention may be implemented.

A method and apparatus for exposing the functionality of an application in a command interface, including generating a CLI from an application's components are described. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

The described embodiments include a method and apparatus for exposing the functionality of an application in a command interface by automatically generating a command line interpreter ("CLI") from an application's components. The application's components may include any components that represent the functionality of the application, such as the components of an application program interface ("API").

In a typical embodiment, a CLI generator receives a request from a developer of an application, or the application itself, to generate a CLI to interpret a command to access a functionality of the application, either before or during execution of the application. The CLI generator then obtains information about one or more components representing the functionality of the application and automatically generates from those components various CLI components to facilitate accessing the functionality of the application using the command.

In a typical embodiment, the CLI generates logic to parse the command according to the application's component, to map the parsed command to the application's component, and to dispatch the command according to the application's component. In some embodiments, a CLI annotator will obtain any metadata associated with the application's components, and apply the metadata to the various CLI components that were generated by the CLI generator. In this way, the CLI annotator customizes the exposure of the functionality of the application via the command interface.

As will be appreciated from the description that follows, the CLI generator advantageously provides application developer's a superior alternative to the laborious and error-prone task of developing the CLI logic by hand. In addition, the CLI generator eliminates the need to manually synchronize the CLI to the functionality in the current version of their application, thereby simplifying the task of maintaining the CLI as new functionality is added to the application.

Before describing embodiments of the invention in further detail, certain terminology relating to CLIs, applications, and their APIs is defined and explained below and used throughout the rest of the description.

In a typical application programming environment, the functionality of the application is embodied in a number of components of the application. For example, in an object-oriented programming environment, the components are typically implemented in class, method and parameter objects of an API that provide access to the functionality of the application in a uniform manner. For example, an application to backup a database on a storage system may have an API that includes one or more method objects and parameter objects that carry out the backup process, such as a method to initiate the backup on the storage system and various parameters to specify the name of the database and a label to apply to the backup.

In some application programming environments, the application's functionality may be represented in other types of components, other than objects. For example, another application to backup a database on a storage system may include in the application a function call to a third party application to carry out a particular task, such as generating a tracking number to associate with the backup. In a procedural programming environment, the call to the third party application could take the form of a procedure call to an function, including a remote procedure call, where the call may pass certain arguments to the function in the form of parameters, similar to the methods and parameters of an API. In a messaging type of programming environment, the call might be implemented in the form of a request to a remote function or process that is accessible over a network via a web service, or web API, using a Simple Object Access Protocol (SOAP) message embedded in the application. The function call, remote procedure call, or SOAP request embedded in a SOAP message are, therefore, examples of other types of application components from which the CLI may be generated. Accordingly, any particular embodiment of the invention does not limit the generation of a CLI from an application's components to API objects.

As noted earlier, a CLI has logic to perform at least three core tasks, parsing/validating, mapping, and dispatching. The logic for a particular command may be organized into separate components of the CLI, referred to as a parser/validator, a mapper, and a dispatcher. The parser/validator parses commands and arguments received from the command interface. The mapper maps the parsed commands and arguments to their functional counterparts in the application, i.e., to create an association between a command and arguments received in the command interface and the corresponding functionality in the application. In some of the embodiments described below, this association may be referred to as a link between the command and arguments received in the command interface and the corresponding components of the application, such as the corresponding API method and parameter objects. In some embodiments, the association may be referred to as a binding object that links the command and arguments to the corresponding components of the application. It should be understood, however, that any particular embodiment of the invention described below does not limit the implementation of the association as a link or a binding object. Lastly, the dispatcher dispatches the parsed and mapped command and arguments by invoking the corresponding components of the application using the link or binding object.

In some application programming environments, the components of the application may be modified by data to customize a particular implementation of the application's components, referred to as metadata. For example, in a Java programming platform, a developer may use metadata in the form of annotations to annotate, or tag, an API object with metadata. In the embodiments of the invention described below, the metadata, such as annotations, may be used advantageously to expose the functionality of the application in the command interface in a more accessible and user-friendly manner. It should be understood, however, that any particular embodiment of the invention does not limit the implementation of the application metadata to annotations, and other techniques for annotating an application's components may be employed without departing from the scope of the claimed embodiments of the invention.

In some application programming environments, the components of the application, such as an API object, may be inspected at runtime using reflection. Reflection is a technique that enables programmers to obtain information about an object at runtime. For example, in the Java programming platform, a developer may use a reflection interface to, among other things, determine the class of an object, get information about the class's modifiers, fields, methods, constructors, and superclasses, find out what constants and method declarations belong to an interface, and create an instance of a class whose name is not known until runtime. In some of the embodiments of the invention described below, a reflection interface may be used advantageously to obtain information about the components of an API to facilitate the generation of a CLI from the API components.

In other embodiments, other techniques may be used to obtain information about the components of an application to facilitate the generation of the CLI from the application, such as pre-compiling, interpreting, or scanning an application that includes function calls in order to identify and parse the function call component representing the functionality of the application. In a messaging programming environment, information about the components of an application may be obtained from the Web Services Description Language (WSDL) used to describe the application (service) available on a remote system hosting the application (service). It should be understood, therefore, that any particular embodiment of the invention described below does not limit the implementation of the generation of a CLI from application components to the use of reflection; other techniques for obtaining information about an application's components before or at runtime may be employed in the generation of a CLI from the application's components without departing from the scope of the claimed embodiments of the invention.

It will be apparent from the description of the embodiments that follow that certain aspects of the present invention may be embodied, at least in part, in software. That is, the techniques may be carried out in a computer system or other data processing system in response to its processor, such as a microprocessor, executing sequences of instructions contained in a memory or other type of internal or external storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as a microprocessor.

In addition to the foregoing, it should be noted that various different software architectures may be used to implement the functions, operations, logic, modules, or other components described herein. The following discussion provides some examples of such an architecture, but it will be understood that alternative architectures may also be employed to achieve the same or similar results.

FIG. 1 shows a simple example of a network environment 100 which incorporates computer systems, such as storage clients 102 and storage server 106, in which embodiments of the CLI generator may be implemented. The storage server 102 is coupled to a storage subsystem 108 which includes a set of mass storage devices, and to the storage clients 102 (hereinafter simply "clients") through a network 104. The network 104 may be, for example, a local area network (LAN), a wide area network (WAN), a global area network (GAN) such as the Internet, a Fibre Channel fabric, or a combination of such networks. Each of the clients 102 may be, for example, a conventional personal computer (PC), server-class computer, workstation, or the like.

The storage subsystem 108 is managed by the storage server 106. The storage server 106 receives and responds to various read and write requests from the clients 102, directed to data stored in or to be stored in the storage subsystem 108. The mass storage devices in the storage subsystem 108 may be, for example, conventional magnetic disks, optical disks such as CD-ROM or DVD based storage, magneto-optical (MO) storage, or any other type of non-volatile storage devices suitable for storing large quantities of data.

Although illustrated as a self-contained element, the storage server 106 may have a distributed architecture. Alternatively, the storage server 106 may have an integrated architecture, where the network and data components are all contained in a single box. The storage server 106 further may be coupled through a switching fabric to other similar storage servers (not shown) which have their own local storage subsystems. In this way, all of the storage subsystems can form a single storage pool, to which any client of any of the storage servers has access.

It should be noted that embodiments of the CLI generator may be adapted for use in other types of storage systems, such as storage servers which provide clients with block-level access to stored data. In addition, embodiments of the CLI generator may be adapted for use in processing systems other than storage systems.

Figure 2:
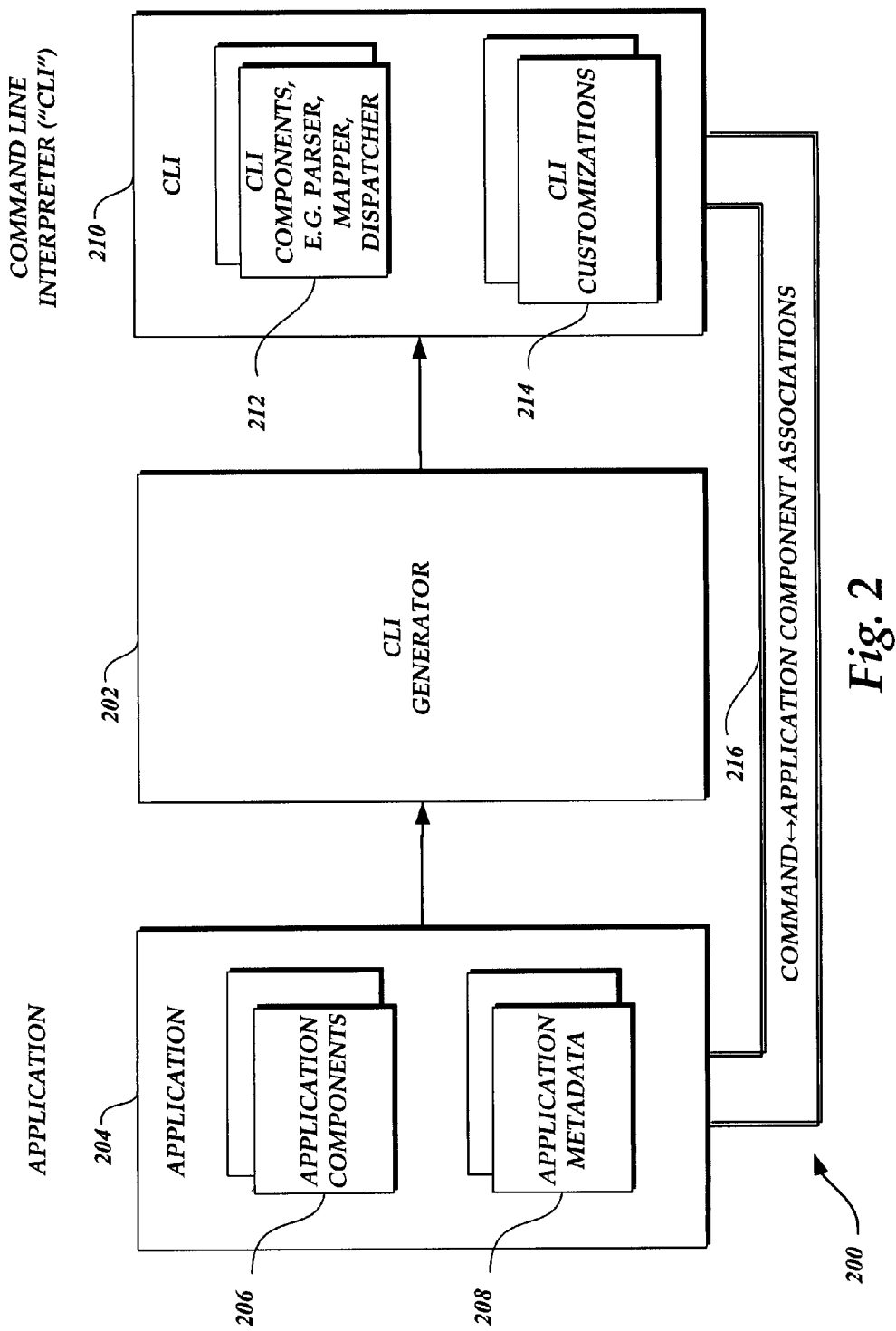
FIG. 2 illustrates a generalized overview of a software architecture for a CLI generator to generate a CLI from an application's components, and to optionally customize the exposure of the functionality of the application in the command interface using the application's metadata, all in accordance with an embodiment of the invention.

FIG. 2 illustrates a generalized overview of a software architecture 200 for a CLI generator to generate a CLI from an application's components, and to optionally customize the exposure of the functionality of the application in the command interface using the application's metadata, in accordance with an embodiment of the invention. The software architecture 200 may be implemented in any general or special purpose operating system having a suitable application programming environment. The software architecture 200 includes a command line interpreter ("CLI") generator 202 operatively coupled to an application 204 having components 206 and, optionally, metadata 208. During operation, the CLI generator 202 receives requests to generate a CLI 210 from the application 204 and application components 206 in order to expose the functionality of the application on a command interface. The generated CLI 210 comprises a number of CLI components 212 that interpret each command and argument received from the command interface, i.e., that perform the parsing, mapping, and dispatching tasks. The CLI generator 202 optionally customizes the exposure of the functionality of the application on the command interface by applying any available application metadata 208 to the appropriate CLI components 212, which are symbolically represented in FIG. 2 as CLI customizations 214. In addition, during operation of the CLI 210, the CLI components 212 are responsible for generating associations 216 between the commands and arguments interpreted by the CLI 210 and the corresponding components 206 representing the functionality of the application. The CLI components 212 may then use the generated associations 216 to access the corresponding functionality of the application when commands are received from the command interface.

Figure 3A:
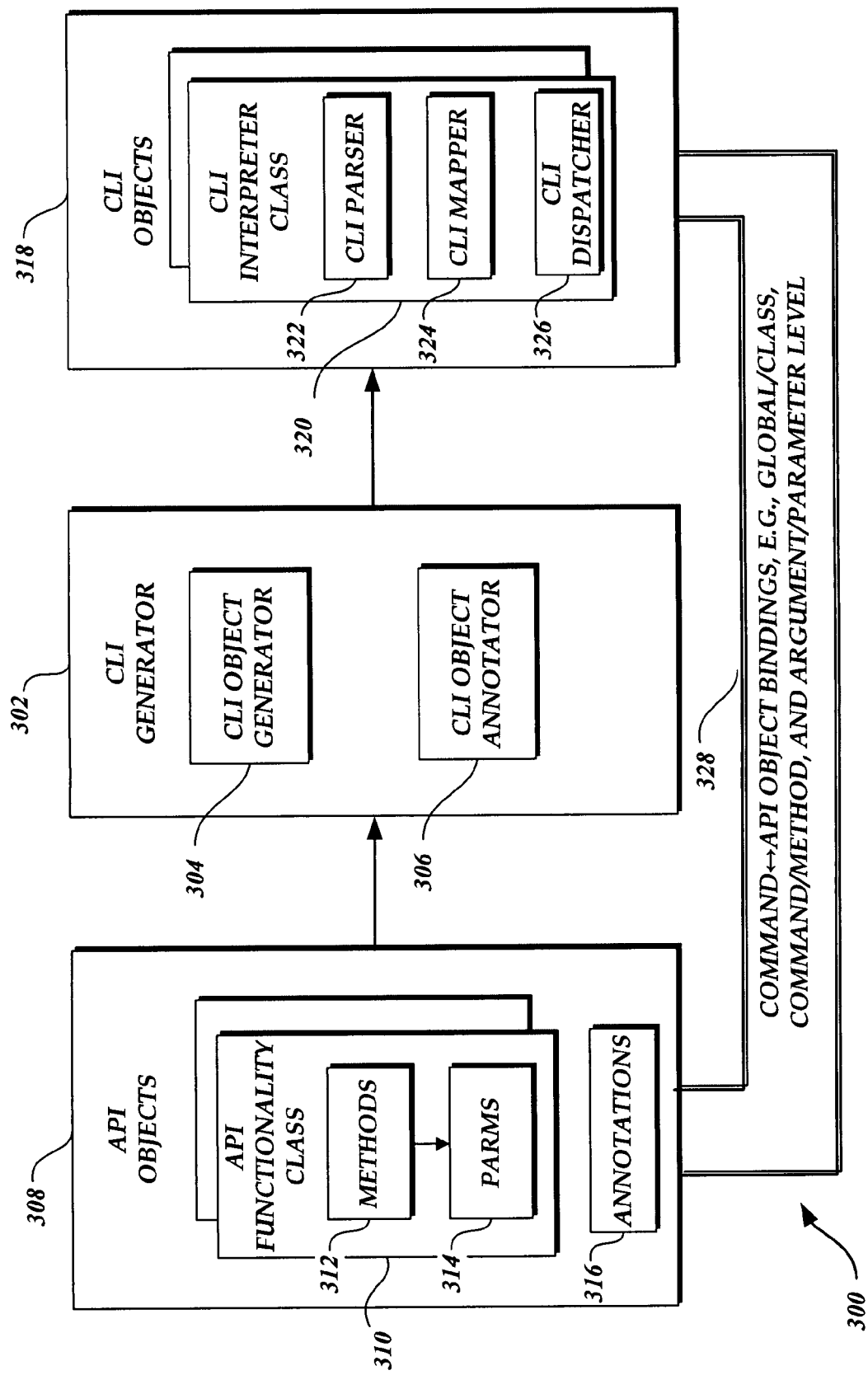
FIG. 3A illustrates an example of the software architecture for a CLI generator of FIG. 2 in accordance with an embodiment of the invention.

FIG. 3A illustrates an example of a software architecture 300 for a CLI generator as in FIG. 2, in this case to generate a CLI having a CLI parser, mapper, and dispatcher from an API 204 where the API components 206 may include API objects 308 that represent the functionality of the application, and to optionally customize the exposure of the functionality of the application in the command interface using API metadata in the form of API annotations 316, in accordance with an embodiment of the invention.

As shown in FIG. 3A, the software architecture 300 includes an API comprising API objects 308 that embody the functionality of the application for which a CLI 318 is to be generated. The API objects 308 may include an API class object 310 having one or more API method objects 312 and related API parameter objects 314. In one embodiment, the API objects 308 may include one or more global parameter objects that are associated not with any particular API method object 312, but rather with an entire API class 310. The API objects 308 may optionally be annotated with API annotations 316 that may be used to customize the exposure of the functionality embodied in the API objects 308 on the command interface as will be described below.

The CLI generator 302 comprises a CLI object generator 304 and, optionally, a CLI object annotator 306. The CLI object generator 304 generates a CLI 318 comprising CLI objects that embody the CLI logic of the core tasks to be performed by the CLI when interpreting particular commands and arguments received in the command interface, where the core tasks include parsing, mapping, and dispatching.

In the illustrated embodiment, the CLI 318 is generated by constructing a CLI interpreter class object 320 from the API Class 310, API Method 312, and API Parameter 314 objects that embody the functionality of the application. As such, the CLI interpreter class object 320 is the means by which a developer would initiate a request to the CLI generator 302 to generate a CLI 318 for their application, and the API Class 310, API Method 312, and API parameter 314 objects are the inputs to the CLI generator 302. In one embodiment, the CLI interpreter class object 320 provides a single public method execute( ) to that provides the parsing, mapping, and dispatching functions of the generated CLI 318 as will be described in more detail below. An example of the CLI interpreter class 320 appears in Example 1.

| CLIInterpreter Example |
| --- |
| +execute(args : String[ ], targetObject : APIClass ) : Object<br>−parse( ) : void<br>−map( ) : void<br>−dispatch( ) : void |
| Example 1 |

When constructed, the CLI interpreter class object 320 includes CLI parser 322, a CLI mapper 324, and a CLI dispatcher 326 objects to contain the parsing, mapping, and dispatching logic for each of the commands and arguments corresponding to each of the API Class 310, API Method 312, and API Parameter 314 objects.

In addition, the CLI interpreter class object 320 uses the CLI mapper 324 object to create object bindings 328 between each of the commands received in the command interface and their corresponding API Method 312 objects. Within each command/method object binding 328, the CLI mapper 324 creates additional object bindings 328 between each of the arguments received in the command interface and their corresponding API Parameter 314 objects. In one embodiment, the argument/parameter object bindings 328 are created by instantiating an object binding subclass that matches the concrete type of the corresponding API Method's parameter 314 object. Examples of concrete types that the illustrated embodiments could support include, among others, primitive types, array types and "java bean" types.

In one embodiment, the CLI mapper 324 object optionally creates global object bindings 328 between any global values, i.e. global arguments, received in the command interface and their corresponding API objects 308, i.e., global parameters. As such, the global object bindings 328 represent command line options received in the command interface that are not associated with a particular command/API method object 312, but rather with an entire API class 310.

In a typical embodiment, the CLI object annotator 306 uses the API annotations 316 to customize the exposure of the functionality embodied in the API Class 310, API Method 312, and API Parameter 314 objects in the corresponding commands and arguments received via the command interface. For example, the CLI object annotator 306 may apply the API annotations 316 to the CLI parser object 322 to modify how a command or argument is to be interpreted by the CLI 318, i.e., to modify the syntax of the command or argument received via the command interface.

Figure 3B:
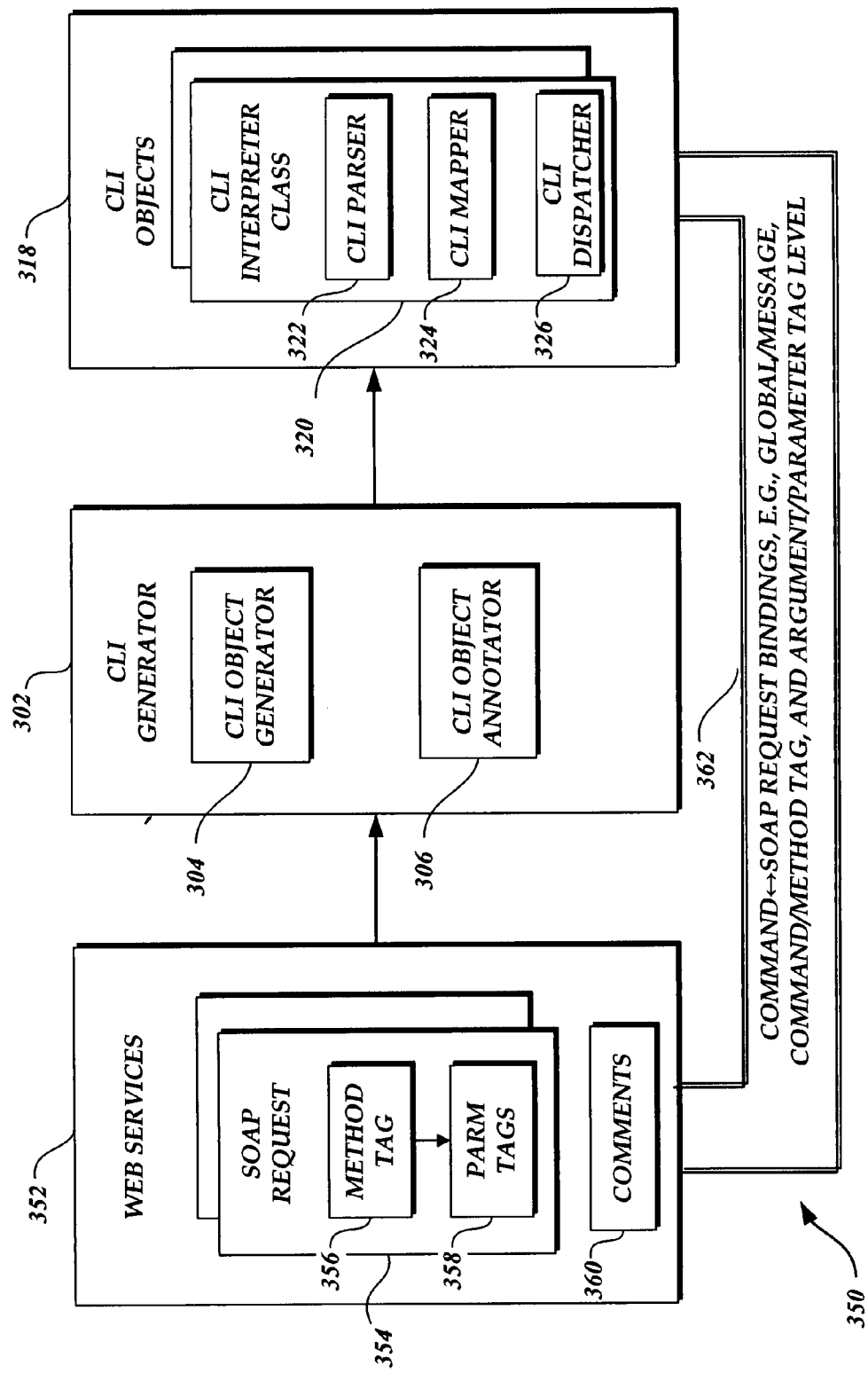
FIG. 3B illustrates an another example of the software architecture for a CLI generator of FIG. 2 in accordance with an embodiment of the invention.

FIG. 3B illustrates an example of a software architecture 350 for a CLI generator as in FIG. 2, in this case to generate a CLI having a CLI parser, mapper, and dispatcher from an application that can be accessed via a web service 352 where the application's components may be accessed using SOAP requests 354 that represent the functionality of the application, and to optionally customize the exposure of the functionality of the application in the command interface using application metadata in the form of web services comments 360 incorporated in the web service's description of the SOAP request 354, in accordance with an embodiment of the invention.

As shown in FIG. 3B, the software architecture 350 includes a web service 352 that describes the SOAP requests 354 that embody the functionality of an application for which a CLI 318 is to be generated, where the functionality of the application is accessible as part of the web service 352 from a remote system hosting the application. The web service 352 may describe a SOAP request 354 having one or more SOAP method tags 356 and related parameter tags 358 using, for example, a WSDL formatted description. In one embodiment, the SOAP request 354 may include one or more global parameter tags that are associated not with any particular method tag 356, but rather with an entire SOAP request 354. The SOAP requests 354 may optionally be annotated with web service comments 360 that may be used to customize the exposure of the functionality embodied in the SOAP requests 354 on the command interface as will be described below.

In the illustrated embodiment, the CLI 318 is generated by constructing a CLI interpreter class object 320 from the SOAP request 354, method tag 356, and related parameter tags 358 that embody the functionality of the application. As such, the CLI interpreter class object 320 is the means by which a developer would initiate a request to the CLI generator 302 to generate a CLI 318 for their application, and the SOAP request 354, method tags 356, and parameter tags 358 are the inputs to the CLI generator 302.

In addition, the CLI interpreter class object 320 uses the CLI mapper 324 object to create SOAP request bindings 362 between each of the commands received in the command interface and their corresponding SOAP method tags 356. Within each command/method tag binding 362, the CLI mapper 324 creates additional SOAP request bindings 362 between each of the arguments received in the command interface and their corresponding SOAP parameter tags 358. In one embodiment, the argument/parameter tag bindings 362 are created by instantiating an object binding subclass that matches the concrete type of the corresponding SOAP method's parameter tags 358. An example of concrete types that the illustrated embodiments could support include any data type that may be defined in the Extended Markup Language (XML) Schema embedded in the web services description of the application's components, i.e., XML Schema embedded in the WSDL description of the SOAP requests 354.

In one embodiment, the CLI mapper 324 object optionally creates global SOAP request bindings 362 between any global values, i.e. global arguments, received in the command interface and their corresponding SOAP requests 354, i.e., global parameters. As such, the global SOAP request bindings 362 represent command line options received in the command interface that are not associated with a particular command/SOAP request method tag 356, but rather with an entire SOAP request 354.

In a typical embodiment, the CLI object annotator 306 uses web service comments 360, if any, to customize the exposure of the functionality embodied in the SOAP request 354, SOAP method tags 356, and SOAP parameter tags 358 in the corresponding commands and arguments received via the command interface. For example, the CLI object annotator 306 may apply the web service comments 360 to the CLI parser object 322 to modify how a command or argument is to be interpreted by the CLI 318, i.e., to modify the syntax of the command or argument received via the command interface.

Figure 4:
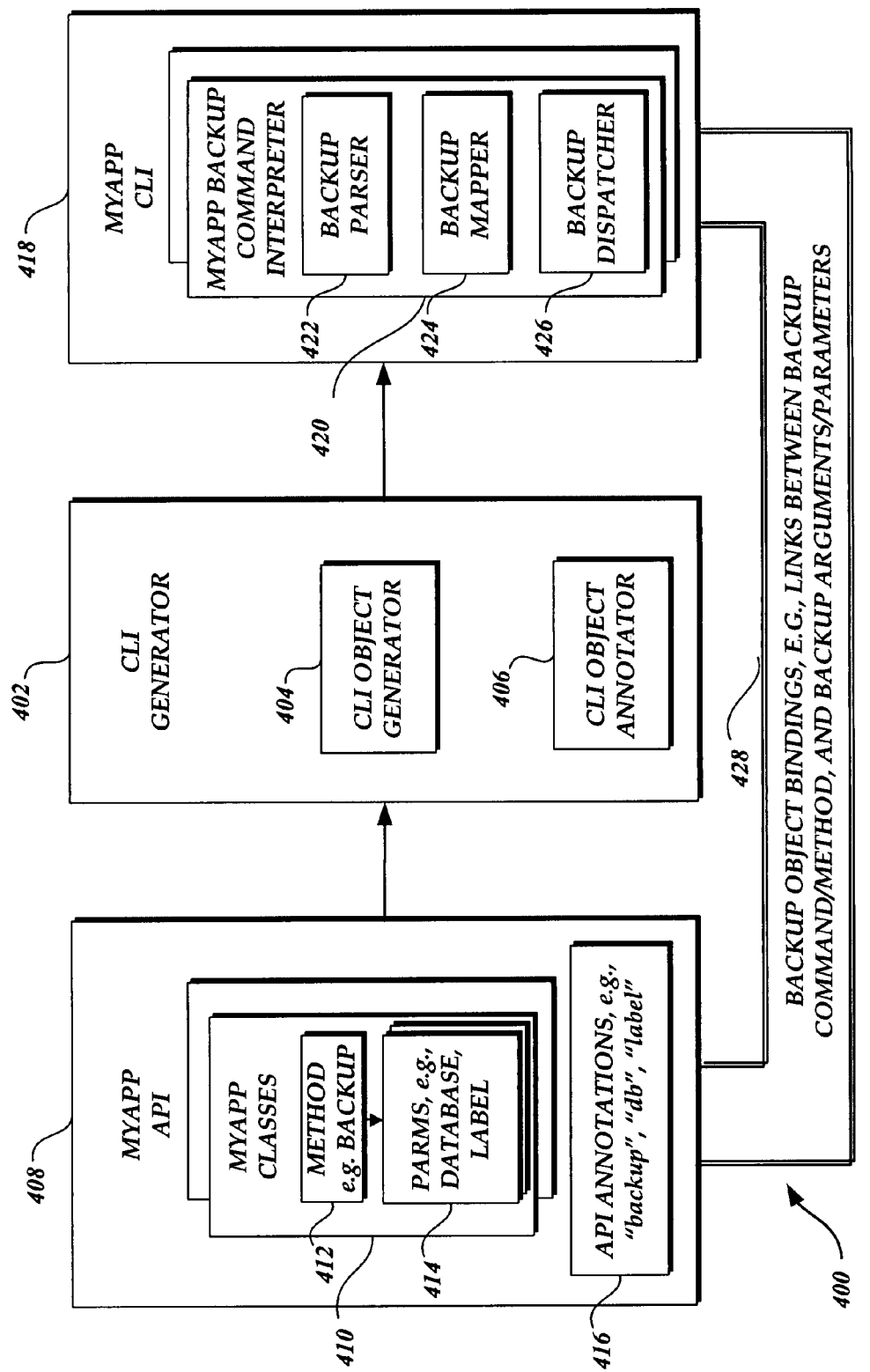
FIG. 4 illustrates in further detail the example of the software architecture for a CLI generator of FIG. 3, in accordance with an embodiment of the invention.

FIG. 4 illustrates in further detail the example of the software architecture 400 for a CLI generator of FIG. 3A, in accordance with an embodiment of the invention. In the illustrated example, an API 408 for the application named MYAPP includes a MYAPP class object 410 having a Backup method object 412 representing functionality that initiates a backup of a database on a storage system. The Backup method object 412 includes parameter objects 414 in which to receive and store the database name of the file to be backed up, DATABASE, as well as the name of the label that is to be affixed to the backup, LABEL. The MYAPP class object 410 is further annotated with annotations 416, including the command name annotation, "backup," the database name annotation, "db," and the label name annotation, "label." An example of the MYAPP Class object 410 in the MYAPP API 408 appears in Example 2, in which the "@Cli" notation is used to specify an annotation 416 that is applied to the MYAPP API 408.

| MYAPP Class object example |
|---|
| class MyApp { <br>   @CliCommand (name="backup") <br>   void backupDatabase (@CliParameter(name="db") String database, <br>     @CliParameter (name="label") String label) { <br>   // Application implementation goes here... <br>   // i.e. take backup of that database and label it with the label <br>   } <br> } |
| Example 2 |

Upon receiving a request from the MYAPP application to generate a MYAPP CLI 418 to interpret commands and arguments received on the command interface of the MYAPP application, the CLI generator 402 generates a MYAPP Backup command Interpreter object 420 comprising a Backup parser object 422, a Backup mapper object 424, and a Backup dispatcher object 426. Further, the CLI generator 402 uses the Backup mapper object 424 to generate the Backup object bindings 428 in preparation for interpreting the Backup command when received on the command interface. In particular the CLI generator 402 uses the Backup mapper object 424 to generate the Backup command object binding 428 between a Backup command and the corresponding Backup method object 412, as well as the Backup parameter object bindings 428 between any Backup arguments and corresponding Backup parameter objects, such as the DATABASE and LABEL Backup parameter objects 414.

In one embodiment, the request to generate the MYAPP CLI 418 is implemented by including code in the MYAPP application to instantiate a MYAPP Backup command Interpreter object 420 as well as code to pass an args array to the execute( ) method of the CLI Interpreter object. An example of the code to request the generation of the MYAPP CLI 418 and execute a single input command line appears in Example 3.

| Example MYAPP code to request generation of MYAPP CLI <br> and execute a single input command line |
|---|
| void main (String [ ] args) { <br>   CliInterpreter myCli = new CliInterpreter(MyApp.class); <br>   myCli.execute(args, new MyApp ( )); <br> } |
| Example 3 |

Since the MYAPP API 408 is further annotated with Annotations 416, including the method annotation, "backup," and the parameter annotations, "db" and "label," the CLI Object annotator 406 of the CLI generator 402 uses the annotation values to modify the Backup parser object 422 to modify the syntax of the BACKUP command to use "db" as the shortened argument name corresponding to the DATABASE parameter object 414, and "label" as the argument name corresponding to the LABEL parameter object 414. Now, a user can enter the BACKUP command using the syntax as it appears in Example 4 to execute a backup of a database named "IMPORTANT_DATABASE" and label it as "Important Backup."

| BACKUP command example |
| --- |
| # myapp backup -db IMPORTANT_DATABASE -label "Important Backup" |
| Example 4 |

Upon receiving the command from the command interface, the previously generated MYAPP CLI 418 identifies the name of the command, in this case BACKUP, and invokes the MYAPP Backup Command Interpreter object 420 to interpret the command using the Backup parser 422, Backup Mapper 424, and Backup dispatcher 426 objects.

Figure 5:
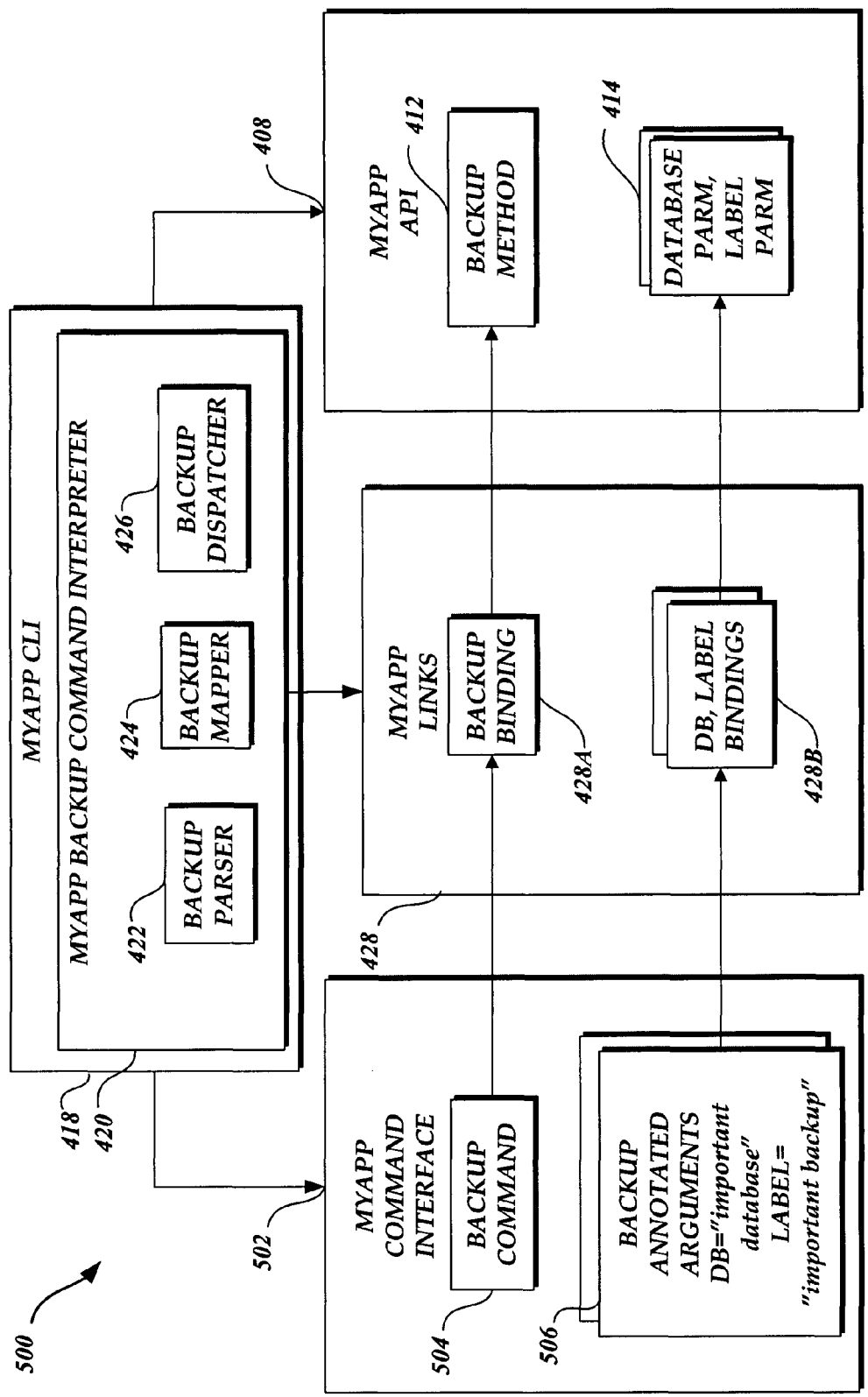
FIG. 5 illustrates an example of a software architecture for interpreting a command and arguments received in a command interface using a CLI generator generated from an application's components as shown in FIGS. 2-4, in accordance with an embodiment of the invention.

FIG. 5 illustrates an example of a software architecture 500 for interpreting a command and arguments received in a command interface using a CLI generator previously generated from an application's components as shown in FIGS. 2-4, and in accordance with an embodiment of the invention. In the illustrated example, the previously generated MYAPP CLI 418 comprising a MYAPP Backup Command Interpreter 420 having a Backup Parser 422, a Backup Mapper 424, and Backup Dispatcher 426, is operatively coupled to a MYAPP Command Interface 502 and a MYAPP API 408. In conjunction with the MYAPP Backup Mapper 424, the MYAPP CLI 418 has already generated MYAPP links 428 between the Backup Command 504 and Backup Annotated DB and LABEL Arguments 506 and the corresponding functionality in the MYAPP API 408, in this case the Backup Method 412 and the Backup DATABASE and LABEL parameters 414, respectively.

In the illustrated embodiment of FIG. 5, the MYAPP links 428 are implemented as a Backup binding object 428A, which is operatively coupled to the MYAPP Backup Method 412, and DB and LABEL binding objects 428B, which are operatively coupled to the Backup Method 412 and Database and Label Parameters 414 objects of the MYAPP API. However, other mechanisms for providing the links 428 may be employed without departing from the scope of the claimed embodiments.

During operation, a BACKUP command 504 and arguments 506 received on the command interface 502 are interpreted by the MYAPP Backup Command Interpreter 420, including being parsed and optionally validated by the Backup Parser 422. The parsed commands and arguments are then dispatched by the Backup Dispatcher 426 by using the corresponding Backup Binding 428A and DB and LABEL Bindings objects 428B to invoke the corresponding Backup Method 412 and Database and Label Parameters 414 objects of the MYAPP API 408.

Figure 6:
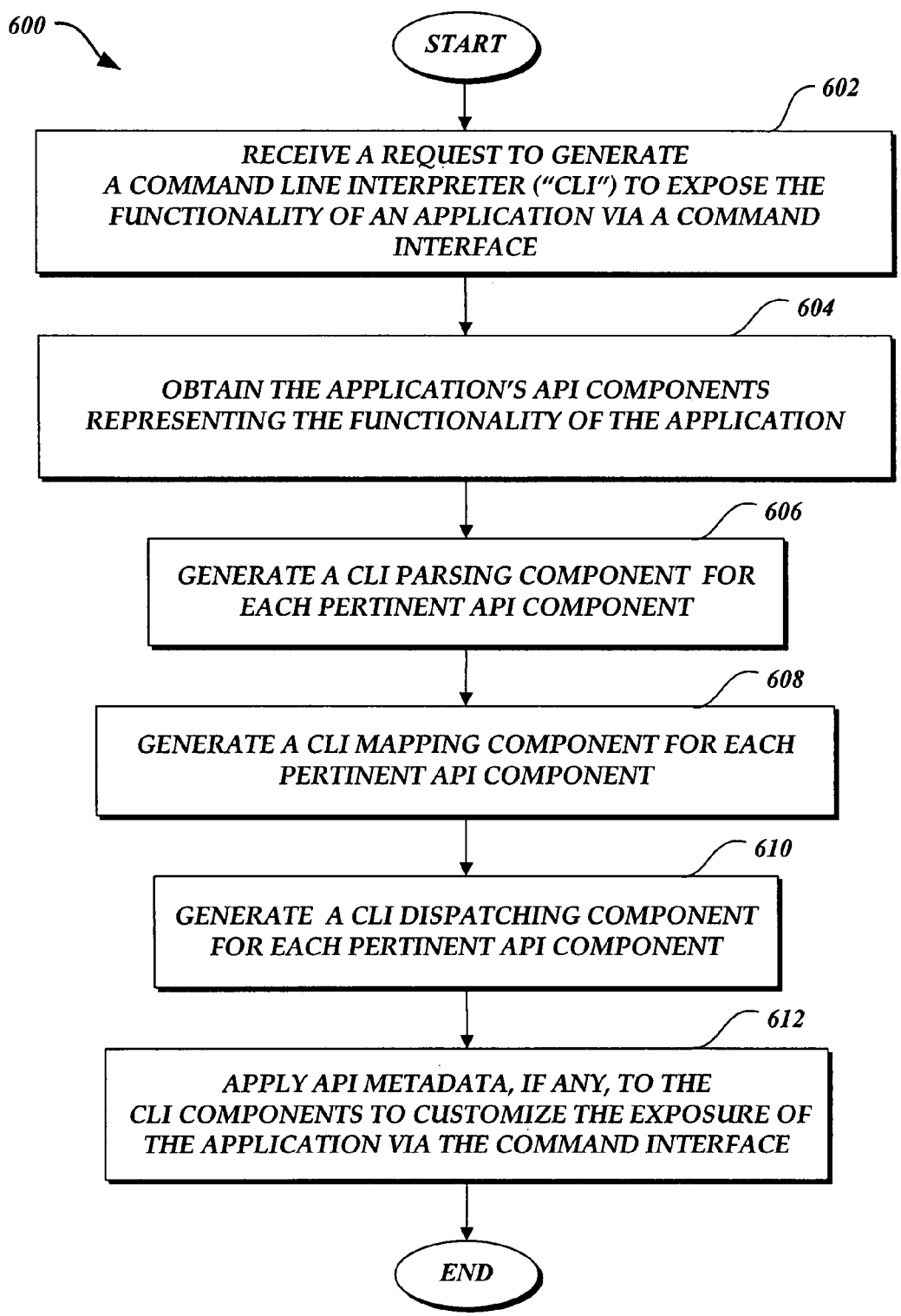
FIG. 6 is a flowchart illustrating certain aspects of generating a CLI from an application's components.

Referring to FIG. 6, methods for implementing an embodiment of the present invention, as described in FIGS. 2-5, are summarized in a flowchart illustrating certain aspects of generating a CLI from an application's components. In an exemplary process 600, the method begins at reference block 602, in which a processor having logic to generate a CLI in accordance with an embodiment of the invention receives a request from an application to generate a CLI to expose the functionality of the application via a command interface. At reference block 604, the processor obtains the application's components that represent the functionality of the application. Processing continues at reference block 606, in which the processor generates a CLI parsing component for each pertinent application component, such as for each method and parameter object representing the functionality of the application. Likewise, processing continues at reference blocks 608 and 610 to generate the mapping and dispatching components, respectively.

At reference block 612, the processor determines whether any metadata is associated with the application's component, and if so, applies the metadata to the CLI components to customize the exposure of the application via the command interface. In a typical embodiment, the application of the metadata is performed on the CLI parsing component to modify the syntax of the command and arguments, or otherwise modify the user-visible aspects of the command and arguments in the command interface.

With reference to FIG. 6, as well as the description of the embodiments thus far, it should be noted that the process 600 may be performed at runtime or prior to runtime (such as at compile-time or during a pre-compilation), depending on the embodiment and/or the requirements of a particular application. For example, it may be advantageous to use the process 600 to generate a CLI for an application at runtime where the application supports a product that is a centralized manager of many systems. For such products, the managed systems could register their APIs with the centralized manager, which in turn would request the generation of the CLIs for the systems at runtime as described in FIG. 6 and elsewhere in this application.

Figure 7:
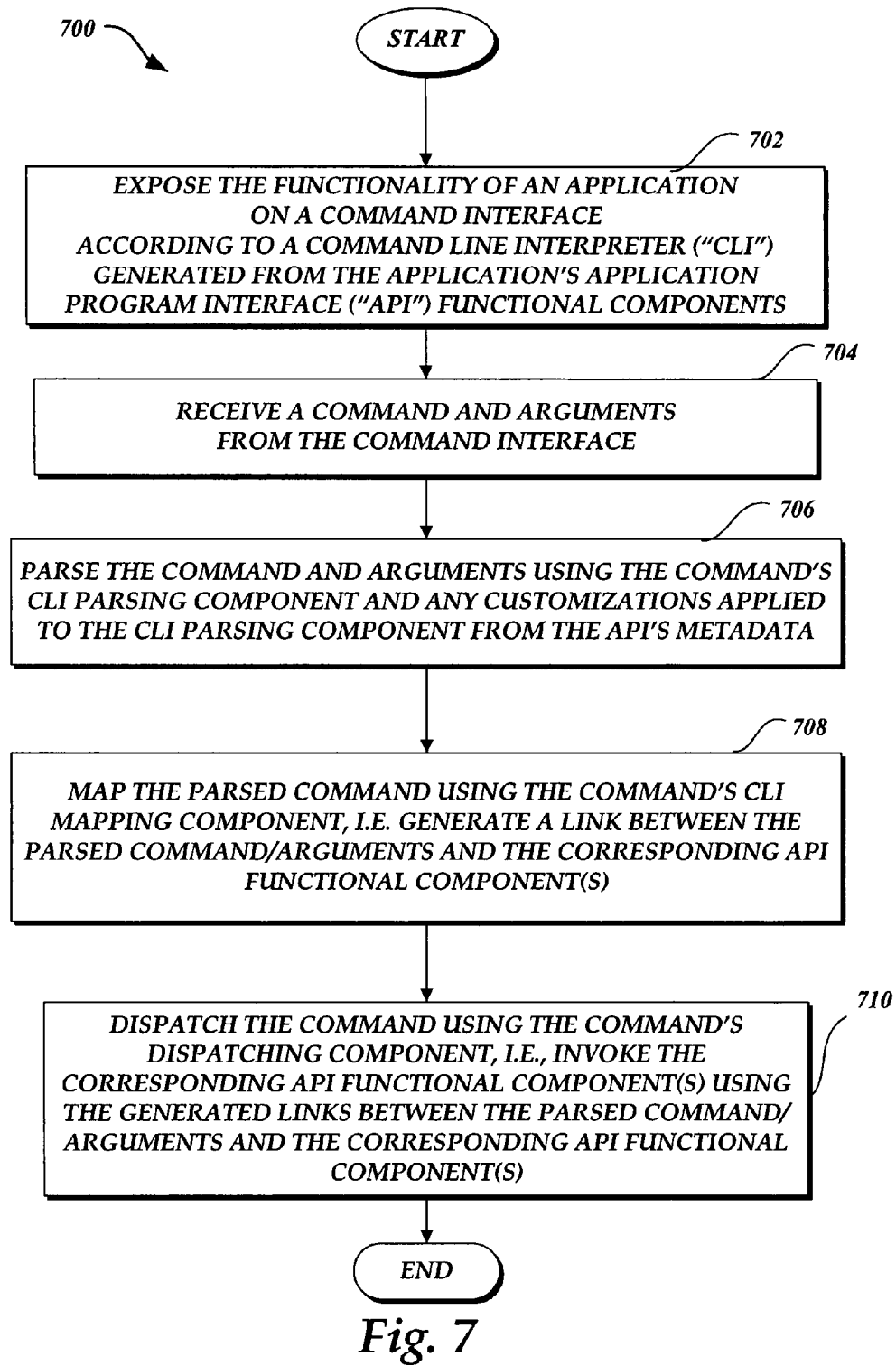
FIG. 7 is a flowchart illustrating certain aspects of interpreting commands in a command interface using a CLI that was generated from an application's components as in FIG. 5.

Referring to FIG. 7, methods for implementing an embodiment of the present invention, as described in FIGS. 2-5, are summarized in a flowchart illustrating certain aspects of interpreting commands in a command interface using a CLI that was generated from an API's components as in FIG. 6.

In an exemplary process 700, the method begins at reference block 702, in which a processor having logic to operate an application exposes the functionality of the application on a command interface according to a CLI that was previously generated from the application's components. At reference block 704, the processor receives a command and arguments from the command interface, and at reference block 706 proceeds to parse the command and arguments using the command's CLI parsing component and any customizations applied to the CLI parsing component from the application component's metadata.

In one embodiment, at reference block 706, the processor maps the parsed command using the command's CLI mapping component. In one embodiment, mapping the parsed command includes generating a link between the parsed command and arguments and the corresponding application's functional component(s). In some cases, the link may have been previously established for the command during an earlier receipt of the command and arguments, or possibly during the generation of the CLI. In any event, once the link is established, processing continues at reference block 710, in which the processor dispatches the command using the command's dispatching component. In one embodiment, dispatching the command includes invoking the corresponding application's functional component(s) using the generated links between the application's components and the parsed commands and arguments.

Figure 8:
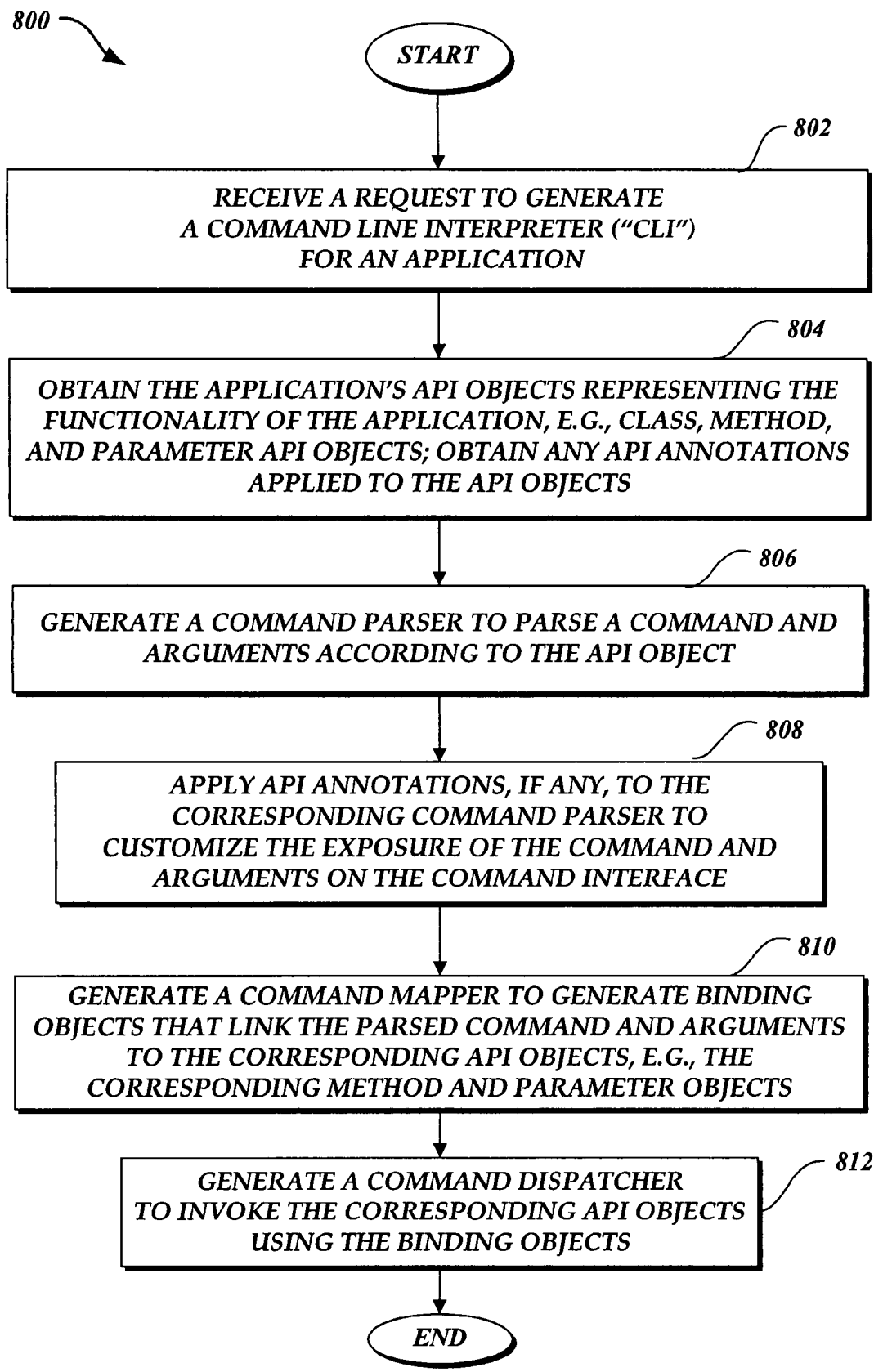
FIG. 8 is a flowchart illustrating in further detail certain aspects of generating a CLI from an application's components.

Referring to FIG. 8, methods for implementing an embodiment of the present invention, as described in FIGS. 2-5, are summarized in a flowchart illustrating certain aspects of generating a CLI from an application's components, where the components are objects, such as class, method, and parameter objects, or other types of components, such as function calls, remote procedure calls, and SOAP requests. In an exemplary process 800, the method begins at reference block 802, in which a processor having logic to generate a CLI in accordance with an embodiment of the invention receives a request from an application to generate a CLI for an application. At reference block 804, the processor obtains the application's components that represent the functionality of the application, as well as any annotations applied to the application's components. Processing continues at reference block 806, in which the processor generates a command parser to parse a command and arguments according to the application component. In the illustrated embodiment, at reference block 808, the processor applies the application component's annotations, if any, to the corresponding command parser to customize the exposure of the command and arguments on the command interface.

Processing continues at reference block 810, in which the processor generates a command mapper to generate binding objects that link the parsed command and arguments to the corresponding application components, such as the corresponding method and parameter objects of an API. Processing concludes at reference block 812, in which the processor generates a command dispatcher to invoke the corresponding application components using the binding objects generated at reference block 810.

Figure 9:
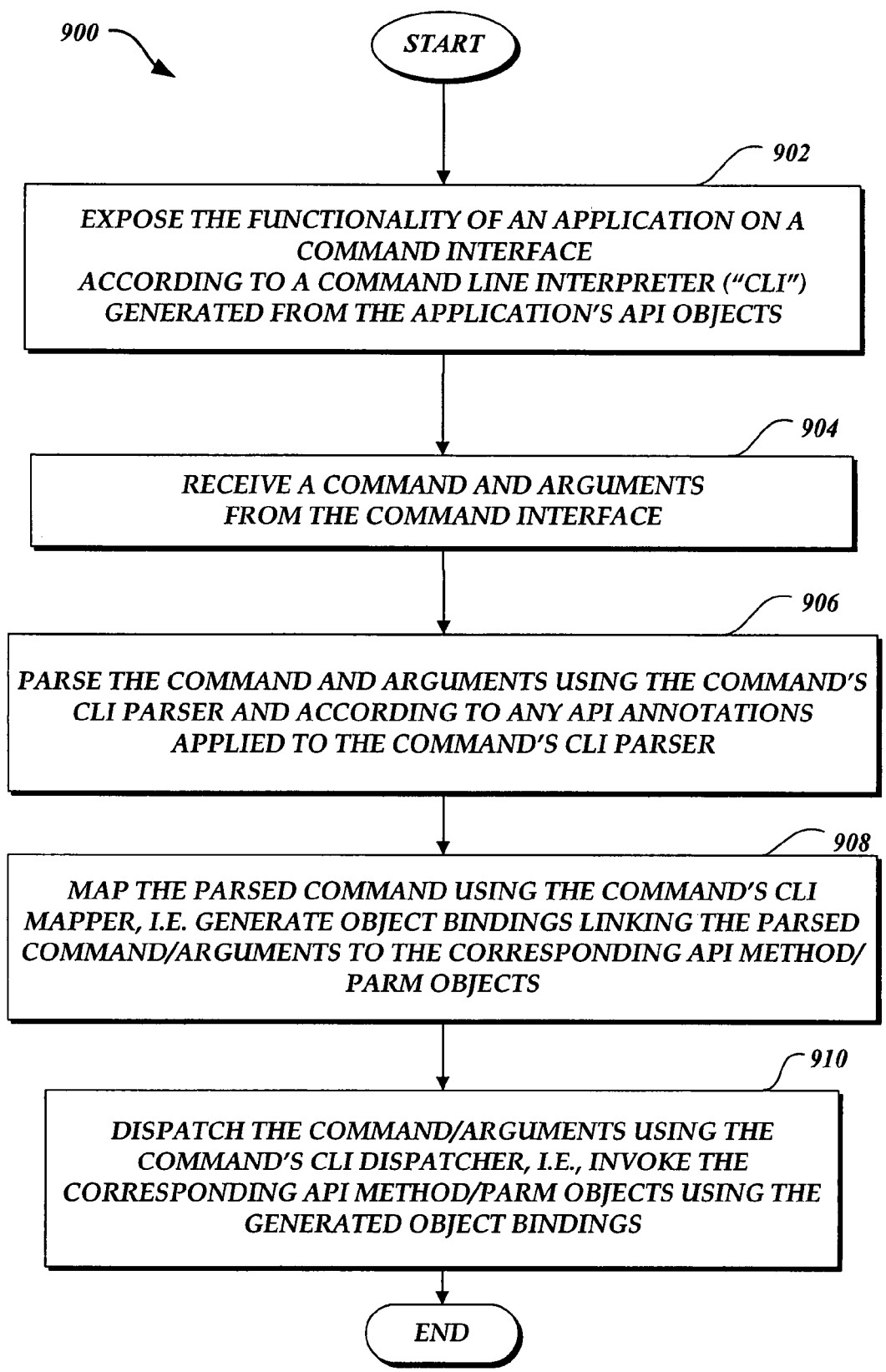
FIG. 9 is a flowchart illustrating certain aspects of interpreting commands in a command interface using a CLI that was generated from an application's components as in FIG. 7.

Referring to FIG. 9, methods for implementing an embodiment of the present invention, as described in FIGS. 2-5, are summarized in a flowchart illustrating certain aspects of interpreting commands in a command interface using a CLI that was generated from an application's components as in FIG. 8.

In an exemplary process 900, the method begins at reference block 902, in which a processor having logic to operate an application exposes the functionality of the application on a command interface according to a CLI that was previously generated from the application's components. At reference block 904, the processor receives a command and arguments from the command interface, and at reference block 906 proceeds to parse the command and arguments using the command's CLI parser and any annotations applied to the CLI parser.

Processing continues at reference block 908, in which the processor maps the parsed command using the command's CLI mapper. In one embodiment, mapping the parsed command includes generating object bindings that link the parsed command and arguments to the corresponding application components, such as the corresponding API method and parameter objects. In some cases, the object bindings have been previously generated for the command during earlier processing of the command and arguments, or possibly during the generation of the CLI. In any event, once the object bindings are generated and available to the processor, processing continues at reference block 910, in which the processor dispatches the command using the command's dispatcher. In one embodiment, the dispatcher invokes the application components using the corresponding object bindings that were generated for the parsed command and arguments.

FIG. 10 shows an example of the hardware architecture of a computer system in which the functionality of an application may be exposed in a command interface in accordance with an embodiment of the invention, including a system in which a CLI may be generated from an application, and in which commands may be interpreted using a CLI generated from an application, as shown in FIGS. 2-9. Certain standard and well-known components which are not germane to the present invention are not shown. The system 1000 may be a general or special purpose computer system that includes one or more processors 1002 and memory 1004 coupled to a bus system 1008. The bus system 1008 shown in FIG. 10 is an abstraction that represents any one or more separate physical buses and/or point-to-point connections, connected by appropriate bridges, adapters and/or controllers. The bus system 1008, therefore, may include, for example, a system bus, a form of Peripheral Component Interconnect (PCI) bus, HyperTransport or industry standard architecture (ISA) bus, small computer system interlace (SCSI) bus, universal serial bus (USB), Inter-IC (I2C) bus, or Institute of Electrical and Electronics Engineers (IEEE) standard 1394 bus (sometimes referred to as "Firewire").

The processors 1002 are the central processing units (CPUs) of the computer system 1000 and, thus, control its overall operation. In certain embodiments, the processors 1002 accomplish this by executing software stored in memory 1004. Such processor 1002 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1004 includes the main memory of the computer system 1000. Memory 1004 represents any form of random access memory (RAM), read-only memory (ROM), flash memory, or the like, or a combination of such devices. Memory 1004 stores (among other things) the storage server's operating system 1006, which can implement the embodiments of the invention described herein.

Also connected to the processors 1002 through the bus system 1008 are a storage adapter 1010 and a network adapter 1012. The storage adapter 1010 allows the computer system 1000 to access a storage subsystem and may be, for example, a Fibre Channel adapter or a SCSI adapter. The network adapter 1012 provides the computer system 1000 with the ability to communicate with remote devices, such as clients over a network and may be, for example, an Ethernet adapter, a Fibre Channel adapter, or the like.

A method and apparatus for exposing the functionality of an application in a command interface have been described. Software to implement the described embodiments of the invention may be stored on a machine-accessible medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc. The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. For example, as noted elsewhere, the invention may be implemented in a variety of application programming environments, including object-oriented, procedural, and messaging programming environments, in which a CLI may be automatically generated from an application components of different types, including API objects, function and remote procedure calls, and SOAP messages. Accordingly, the specification and drawings are to be regarded in an illustrative sense rather than a restrictive sense.

What is claimed is:

1. A method of exposing a functionality of an application in a command interface comprising:

receiving as input, by a processor, an application programming interface (API) defining the functionality of the application, the API including API objects, one or more of the API objects are annotated with annotations, wherein the annotations customize exposure of the functionality of the application on the command interface; and automatically generating from the API a command line interpreter (CLI) component, the CLI component to:

parse a command and at least one argument received from the command interface, wherein during parsing, modify syntax of the received command and the at least one argument using the annotations, map the parsed command and the at least one argument to corresponding ones of the API objects, and dispatch the command to invoke the corresponding API objects.

2. The method as recited in claim 1, wherein mapping the parsed command comprises generating an association between the parsed command and a corresponding API method object.

3. The method as recited in claim 2, wherein generating an association between the parsed command and the corresponding API method object comprises generating a binding object that links the parsed command to the corresponding API method object.

4. The method as recited in claim 1, wherein mapping the parsed command comprises mapping the parsed command to a corresponding API method object, and further mapping the at least one argument to a parameter associated with the corresponding API method object.

5. The method as recited in claim 1, wherein mapping the parsed command comprises generating an association between the parsed command and a corresponding API method, and further generating an association between each of parsed arguments and corresponding parameters associated with the API method.

6. The method as recited in claim 5, wherein the associations generated between the parsed command and parsed arguments and the corresponding API method and parameters are binding objects, and further wherein dispatching the command comprises invoking the corresponding API method and parameters using the binding objects.

7. The method as recited in claim 1, further comprising:
receiving metadata associated with the API; and
using the API's metadata in the CLI component to customize accessing the functionality of the application using the command.

8. The method as recited in claim 7, wherein the API's metadata comprises the annotations, and further wherein using the API's metadata in the CLI component to customize accessing the functionality of the application comprises modifying the command with one or more of the annotations.

9. The method as recited in claim 8, wherein using the API's metadata in the CLI component to customize accessing the functionality of the application comprises modifying an argument associated with the command with one or more of the annotations.

10. The method as recited in claim 8, wherein the annotation comprises text for modifying a user-visible portion of a command on the command interface.

11. The method as recited in claim 8, wherein the annotation comprises text for modifying a user-visible portion of an argument on the command interface.

12. The method as recited in claim 1, wherein the API representing the functionality of the application includes an object that describes a global parameter of the application, wherein the global parameter of the application comprises a value used to globally modify commands accessing the functionality of the application.

13. The method as recited in claim 1, wherein the request to generate the CLI to interpret the command to access the functionality of the application is received during execution of the application.

14. The method as recited in claim 1, wherein the request to generate the CLI to interpret the command to access the functionality of the application is received prior to execution of the application.

15. The method as recited in claim 1, wherein the request to generate the CLI to interpret the command to access the functionality of the application is received during a compilation of the application.

16. A system for generating a command line interpreter (CLI) to access a functionality of an application via a command interface, the system comprising:

memory to store a CLI generator, wherein the CLI generator outputs a CLI from an interface component of an application as input, the interface component having interface component methods for accessing a functionality of the application, the interface component further having parameters associated with the interface component methods, one or more of the interface component methods and the parameters are annotated with annotations, wherein the annotations customize exposure of the functionality of the application on the command interface; and a processor coupled to the memory to execute the CLI generator and to thereby automatically generate the CLI from the interface component, wherein the generated CLI comprises a parser to parse a command and at least one argument received via the command interface, wherein during parsing, the parser is to modify syntax of the received command and the at least one argument using the annotations, the generated CLI further comprising a mapper to map the parsed command to a corresponding one of the interface component method, and to further map the at least one argument to a corresponding one of the parameters, and the generated CLI further comprising a dispatcher to invoke the corresponding interface component method and the corresponding parameter.

17. The system recited in claim 16, wherein the processor further is to generate the mapper to create binding objects that link the command to the corresponding interface component method and link the at least one argument to the corresponding parameter; and further is to generate the dispatcher to use the binding objects to invoke the corresponding interface component method and the corresponding parameter to which the parsed command and the at least one argument are linked.

18. The system recited in claim 17, wherein the processor further is to identify one or more of the annotations associated with the interface component, and applies the one or more of the annotations to the CLI to customize the access of the functionality of the application via the command interface.

19. The system recited in claim 18, wherein the processor further is to identify a global parameter associated with the interface component, and to use the global parameter with commands that access the functionality of the application via the command interface.

20. The system recited in claim 18, wherein at least one of the annotations is a value applied locally to a particular command corresponding to a method of the interface component.

21. The system recited in claim 18, wherein at least one of the annotations is a value applied locally to a particular argument corresponding to a parameter of a method of the interface component.

22. The system recited in claim 16, wherein the processor is to generate the CLI from the interface component methods during execution of the application.

23. The system recited in claim 16, wherein the processor is to generate the CLI from the interface component methods prior to execution of the application.

24. The system recited in claim 23, wherein the processor is to generate the CLI prior to execution of the application including during compilation of the application.

25. The system recited in claim 16, wherein to generate the CLI from the application component methods further comprises to instantiate an interpreter object that represents the CLI and contains the parser, the mapper, and the dispatcher for each interface component methods.

26. The system recited in claim 16, wherein the interface component is an application programming interface (API) object.

27. The system recited in claim 16, wherein the interface component is a Web Services Description Language (WSDL) description of a Simple Object Access Protocol (SOAP) request.

28. The system recited in claim 16, wherein the interface component is a call to a function.

29. The system recited in claim 16, wherein the interface component is a call to a remote procedure.

30. An apparatus comprising:
a processor; and
memory coupled to the processor to store a command line interpreter (CLI) generator executable by the processor, wherein the CLI generator outputs a CLI from an application program interface (API) as input for providing access to a functionality of an application via a command interface, the API defining the functionality of the application and including API objects, one or more of the API objects are annotated with annotations, wherein the annotations customize exposure of the functionality of the application on the command interface, the CLI generator comprising:
a CLI object generator to receive the API and to automatically generate CLI objects, the CLI objects comprising a parser to parse a command and at least one argument received via the command interface, wherein during parsing, the parser is to modify syntax of the received command and the at least one argument using the annotations, the CLI objects further comprising a mapper to map the parsed command and the least one argument to corresponding API objects, and a dispatcher to dispatch the command by invoking the corresponding API objects.

31. The apparatus recited in claim 30, wherein at least one of the API objects comprises a method having a parameter, and further wherein the parser is to parse the command corresponding to the method and parsing an argument corresponding to the parameter.

32. The apparatus recited in claim 31, wherein the mapper is to create binding objects that link the parsed command to the method and further link the parsed argument to the parameter.

33. The apparatus recited in claim 32, wherein the dispatcher is to use the binding objects to invoke the corresponding method and parameter to which the parsed command and argument are linked.

34. The apparatus recited in claim 30, further comprising:
a CLI annotator to annotate the CLI objects that correspond to the corresponding API objects using one or more of the annotations associated with the API to customize accessing of the functionality of the application via the command interface.

35. The apparatus recited in claim 34, wherein at least one of the annotations is a value applied locally to a particular command corresponding to an API object.

36. The apparatus recited in claim 34, wherein at least one of the annotations is a value applied locally to a particular argument corresponding to an API object.

37. The apparatus recited in claim 30, wherein the CLI object generator is to generate the CLI objects during execution of the application.

38. The apparatus recited in claim 30, wherein the CLI object generator is to generate the CLI objects prior to execution of the application.

39. The apparatus recited in claim 30, wherein the CLI object generator is to generate the CLI objects during compilation of the application.

40. The apparatus recited in claim 30, wherein the CLI object generator is instantiated from an interpreter object that represents the CLI and contains the parser, mapper, and dispatcher CLI objects for each API object that accesses a functionality of the API.

41. The apparatus recited in claim 30, wherein the API object is a global parameter object, and further wherein the parser is to parse a global argument corresponding to the global parameter object and to use the global argument with commands that access the functionality of the application via the command interface.

\* \* \* \* \*